US011220558B2

(12) United States Patent
Kanellopoulos et al.

(10) Patent No.: US 11,220,558 B2
(45) Date of Patent: Jan. 11, 2022

(54) METHOD, AN ARRANGEMENT AND USE OF AN ARRANGEMENT OF PREPARING POLYMER

(71) Applicant: Borealis AG, Vienna (AT)

(72) Inventors: Vasileios Kanellopoulos, Linz (AT); Apostolos Krallis, Porvoo (FI); Klaus Nyfors, Porvoo (FI); Erno Elovainio, Porvoo (FI)

(73) Assignee: BOREALIS AG, Vienna (AT)

( * ) Notice: Subject to any disclaimer, the term of this patent is extended or adjusted under 35 U.S.C. 154(b) by 150 days.

(21) Appl. No.: 16/605,526

(22) PCT Filed: Jun. 15, 2018

(86) PCT No.: PCT/EP2018/065938
§ 371 (c)(1),
(2) Date: Oct. 16, 2019

(87) PCT Pub. No.: WO2018/234175
PCT Pub. Date: Dec. 27, 2018

(65) Prior Publication Data
US 2020/0123279 A1    Apr. 23, 2020

(30) Foreign Application Priority Data
Jun. 20, 2017    (EP) .................................... 17176804

(51) Int. Cl.
*C08F 2/01*    (2006.01)
*B01J 8/00*    (2006.01)
(Continued)

(52) U.S. Cl.
CPC .............. *C08F 2/01* (2013.01); *B01J 8/0055* (2013.01); *B01J 8/388* (2013.01); *C08F 2/001* (2013.01);
(Continued)

(58) Field of Classification Search
USPC ...................... 526/67; 422/147, 613; 34/592
See application file for complete search history.

(56) References Cited

U.S. PATENT DOCUMENTS

| 3,324,093 A | 6/1967 | Alleman |
| 3,405,109 A | 10/1968 | Rohlfing |

(Continued)

FOREIGN PATENT DOCUMENTS

| EP | 45976 A2 | 2/1982 |
| EP | 45977 A2 | 2/1982 |

(Continued)

OTHER PUBLICATIONS

Office Action for Korean Application No. 10-2019-7035518 dated Nov. 17, 2020 and English Translation thereof, 12 pages.

(Continued)

*Primary Examiner* — Fred M Teskin
(74) *Attorney, Agent, or Firm* — Lowenstein Sandler LLP

(57) ABSTRACT

A method and arrangement of producing polymer comprising polymerizing in reactor having a top zone having a generally conical shape, a middle zone in direct contact with and below said top zone having a generally cylindrical shape, a bottom zone having a generally conical shape thereby polymerizing at least one olefin, in the presence of a polymerization catalyst and fluidization gas to obtain (i) a first stream comprising fluidization gas and particles of olefin polymer, (ii) a second stream comprising fluidization gas and agglomerates of olefin polymer, (iii) a third olefin polymer product stream, —directing the first stream comprising fluidization gas and olefin polymer particles to a series of at least three cyclones connected to the fluidized bed reactor, —separating agglomerates of olefin polymer
(Continued)

from the second stream, withdrawing from the fluidized bed polymerization reactor the third olefin polymer product stream.

19 Claims, 1 Drawing Sheet

(51) Int. Cl.
    *B01J 8/38*     (2006.01)
    *C08F 2/00*     (2006.01)
    *C08F 2/34*     (2006.01)
    *C08F 210/16*     (2006.01)

(52) U.S. Cl.
    CPC .............. *C08F 2/34* (2013.01); *C08F 210/16* (2013.01); *B01J 2208/00982* (2013.01); *B01J 2219/0004* (2013.01); *B01J 2219/1943* (2013.01); *B01J 2219/1946* (2013.01); *B29K 2023/06* (2013.01)

(56) References Cited

U.S. PATENT DOCUMENTS

| | | | |
|---|---|---|---|
| 4,107,414 A | 8/1978 | Giannini et al. | |
| 4,186,107 A | 1/1980 | Wagner | |
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,582,816 A | 4/1986 | Miro | |
| 4,621,952 A | 11/1986 | Aronson | |
| 4,657,882 A | 4/1987 | Karayannis et al. | |
| 5,391,654 A | 2/1995 | Ahvenainen et al. | |
| 9,249,362 B2 * | 2/2016 | Harris ................... | C10G 1/08 |
| 2014/0080991 A1 * | 3/2014 | Eriksson ................ | C08F 10/00 |
| | | | 526/351 |
| 2015/0218295 A1 * | 8/2015 | Kanellopoulos ....... | B01J 8/1827 |
| | | | 526/59 |

FOREIGN PATENT DOCUMENTS

| | | | |
|---|---|---|---|
| EP | 47077 | A1 | 3/1982 |
| EP | 188125 | A2 | 7/1986 |
| EP | 250169 | A2 | 12/1987 |
| EP | 372239 | A2 | 6/1990 |
| EP | 479186 | A2 | 4/1992 |
| EP | 579426 | A1 | 1/1994 |
| EP | 683176 | A1 | 11/1995 |
| EP | 688794 | A1 | 12/1995 |
| EP | 810235 | A2 | 12/1997 |
| EP | 887380 | A1 | 12/1998 |
| EP | 1415999 | A1 | 5/2004 |
| EP | 1538167 | A1 | 6/2005 |
| EP | 1600276 | A1 | 6/2005 |
| EP | 1739103 | A1 | 1/2007 |
| EP | 1752462 | A1 | 2/2007 |
| EP | 1860125 | A1 | 11/2007 |
| EP | 2330135 | A1 | 6/2011 |
| EP | 2495037 | A1 | 9/2012 |
| EP | 2495038 | A1 | 9/2012 |
| EP | 2594433 | A1 | 5/2013 |
| EP | 2890490 | A1 | 7/2015 |
| EP | 2913345 | A1 | 9/2015 |
| EP | 2913346 | A1 | 9/2015 |
| EP | 3103818 | A1 | 12/2016 |
| GB | 1580635 | A | 2/1921 |
| GB | 1272778 | A | 5/1972 |
| GB | 1506170 | | 4/1978 |
| WO | 9212182 | A1 | 7/1992 |
| WO | 9512622 | A1 | 5/1995 |
| WO | 9532994 | A1 | 12/1995 |
| WO | 9618662 | A1 | 6/1996 |
| WO | 9632423 | A1 | 10/1996 |
| WO | 9728170 | A1 | 8/1997 |
| WO | 9832776 | A1 | 7/1998 |
| WO | 9858976 | A1 | 12/1998 |
| WO | 9858977 | A1 | 12/1998 |
| WO | 9925469 | A1 | 5/1999 |
| WO | 9951646 | A1 | 10/1999 |
| WO | 9961489 | A1 | 12/1999 |
| WO | 0029452 | A1 | 5/2000 |
| WO | 0155230 | A1 | 8/2001 |
| WO | 02088194 | A1 | 11/2002 |
| WO | 03010208 | A1 | 2/2003 |
| WO | 03051514 | A1 | 6/2003 |
| WO | 03051934 | A2 | 6/2003 |
| WO | 2003106510 | A1 | 12/2003 |
| WO | 2004085499 | A2 | 10/2004 |
| WO | 2005118655 | A1 | 12/2005 |
| WO | 2014032794 | A1 | 3/2014 |

OTHER PUBLICATIONS

Examination Report with English Translation for Indian Application No. 201917045717 dated Dec. 4, 2020, 6 pages.
Dompazis et al., "Development of a multi-scale, multi-phase, multi-zone dynamic model for the prediction of particle segregation in catalytic olefin polymerization FBRs," Chem. Eng. Sci. 63, 2008, 19 pages.
Kirk-Othmer, Encyclopedia of Chemical Technology, 2nd edition (1966), vol. 10, pp. 340-342,3 pages.
International Search Report for PCT PCT/EP2018/065938 dated Aug. 21, 2018, 11 pages.
English Translation of TW Office Action for Taiwanese Patent Application No. 107120663 dated Sep. 18, 2019, 4 pages.
Office Action for Russian Application No. 201992652 dated Apr. 28, 2021 and English Translation thereof, 6 pages.

* cited by examiner

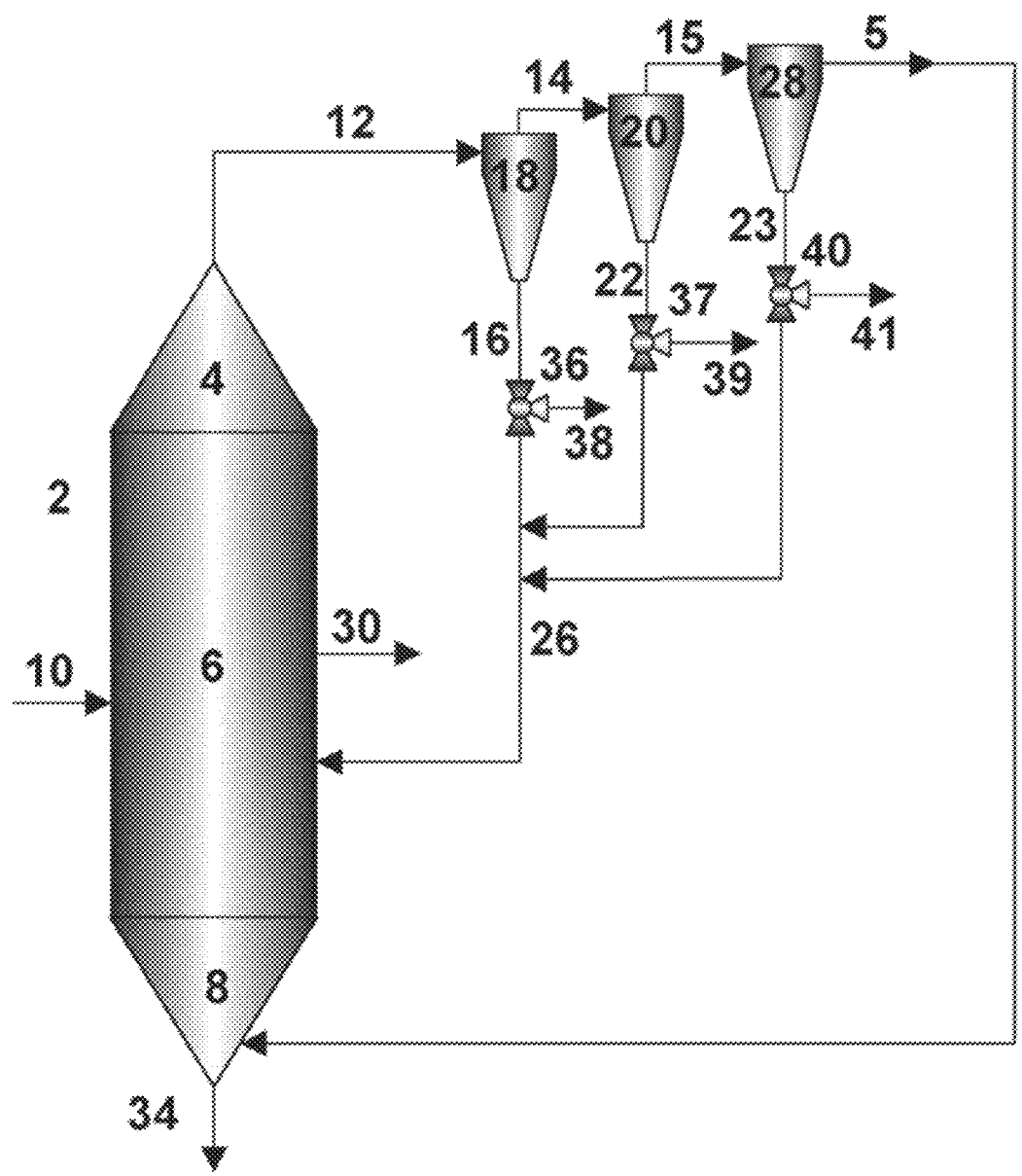

METHOD, AN ARRANGEMENT AND USE OF AN ARRANGEMENT OF PREPARING POLYMER

CROSS-REFERENCE TO RELATED APPLICATION(S)

This application is a national phase of International Application No. PCT/EP2018/065938, filed on Jun. 15, 2018, which claims the benefit of European Patent Application No. 17176804.7, filed on Jun. 20, 2017. The contents of these applications are hereby incorporated by reference in their entirety.

FIELD OF THE INVENTION

The present invention relates to a method, an arrangement and use of the arrangement for preparing polymer.

BACKGROUND OF THE INVENTION

Conventional fluidized bed reactors, i.e. bubbling gas phase olefin polymerization reactors are known in the art. They typically operate under moderate superficial gas velocity values, especially for polyethylene production, in order to secure that sufficient gas-solids mixing efficiency is achieved and the solids carryover/entrainment phenomena is limited. Typical superficial gas velocity values used, typically for polyethylene, are 0.35-0.5 m/s and for polypropylene, 0.40-0.70 m/s. However, depending on the polymer grade to be produced, a number of operability issues could be encountered with relating to quality of the fluidization, solids segregation and bed homogeneity. In Dompazis et al. 2008, *Development of a multi-scale, multi-phase, multi-zone dynamic model for the prediction of particle segregation in catalytic olefin polymerization FBRs* by G. Dompazis, V. Kanellopoulos, V. Touloupides, C. Kiparissides, *Chem. Eng. Sci.* 63, 2008 pp. 4735-4753 is shown a particle size distribution along a bubbling fluidized bed reactor for sufficient and insufficient mixing conditions under different superficial gas velocities ($u_o$). It should be noted that in conventional fluidized bed reactors the significant particle carryover (entrainment) is expected to result in exceptionally high risk of reactor shut down due to compressor and cooling unit fouling.

Reactor assemblies and methods relating thereto with a so called "double cone reactor structure" have been presented for example in EP2495037, EP2495038, EP2913346, EP2913345, EP2890490, EP 3103818. However, none of these relates to a method or arrangement of the present invention with at least three cyclones and agglomerates removal, More specifically, none of these relates to method or arrangement of producing polymer with narrow particle size distribution.

BRIEF DESCRIPTION OF THE INVENTION

An object of the present invention is to provide a method, an arrangement and use of the arrangement (apparatus) for preparing polymer, and more typically for preparing polymer with narrow particle size distribution (PSD) so as to alleviate the disadvantages of the prior art. The objects of the invention are achieved by a method, an arrangement and use of the arrangement, which are characterized by what is stated in the independent claims. The preferred embodiments of the invention are disclosed in the dependent claims.

The invention is based on the idea of employment of a special fluidized bed reactor structure, i.e. a so called double cone reactor, with at least three cyclones connected thereto in series together with agglomerate removal from the reactor thereby enabling operating at high superficial gas velocities and circulating of the polymer particles. In the method and apparatus of the present invention the small polymer particles (fines) are forced to stay longer residence time under reaction conditions while very large polymer particles (agglomerates) are removed, typically from the bottom of the reactor. This has the advantage of thereby leading to narrower particle size distribution and better homogeneity of the fluidization bed compared to the conventional bubbling fluidized bed reactors. Furthermore, the present invention with the unique "double cone reactor" structure connected with at least three, i.e. three or more cyclones and with possibility to remove larger polymer particles from the bottom zone of the reactor has the advantage that no mixing devices, no disengagement zone, no distribution plate are needed in the reactor and high space time yield and small reactor volumes are achieved compared to conventional methods and/or arrangements. In the method and apparatus of the present invention the gas-solids flow hydrodynamic pattern follows slugging/fast fluidization conditions, which improves the gas-solids mixing capabilities improving production of polymer with increased homogeneity (e.g. particle size distribution). Especially better hydrodynamic conditions lead to reducing the segregation phenomena in the gas phase reactor, in other words the particle size distribution is the same at various reactor zones (i.e. bottom, middle, top).

It has been found that the gas flow needed to obtain good conditions without excess entrainment of polymer from the bed, on one hand, and reduced adhesion of polymer on the walls, on the other hand, depends on the properties of the polymer powder. For reactors with L/D of the middle zone of 4 or greater, preferably 5 or greater it has now been found that the gas velocity should be chosen such that the dimensionless number, $N_{Br}$, is within the range of from 2.5 to 7, more preferably from 2.5 to 5. The number $N_{Br}$ can be calculated by using equation (I):

$$N_{Br} = \frac{\frac{d_{90} - d_{10}}{d_{50}}}{\frac{U_s}{U_t}} \quad \text{(I)}$$

In equation (I) $d_{90}$ denotes the smallest equivalent particle diameter such that 90% of all particles within the bed have a smaller equivalent diameter than $d_{90}$; $d_{10}$ denotes the smallest equivalent particle diameter such that 10% of all particles within the bed have a smaller equivalent diameter than $d_{10}$; $d_{50}$ represents the median equivalent particle diameter of the particles within the bed; $U_s$ is the superficial gas velocity within the middle zone; and $U_t$ is the terminal velocity of the particles within the reactor. According to Geldart (Gas Fluidization Technology, John Wiley & Sons, 1986), equation 6.16, the terminal velocity in turbulent regime can be calculated from the equation (II) below:

$$U_t = \sqrt{\frac{4}{3} \cdot \frac{(\rho_p - \rho_g) \cdot g \cdot d_v}{K_N \cdot \rho_g}} \quad \text{(II)}$$

In equation (II) $\rho_p$ denotes the particle density (which is the mass of the particle divided by its hydrodynamic volume; the volume of eventual pores is included in the hydrodynamic volume, see explanations in section 6.12 of Geldart), $\rho_g$ is the density of the fluidization gas, g is the gravity acceleration constant (9.81 m/s$^2$), $d_v$ is the volume diameter of the particles (median volume diameter if the particles have different diameters), and $K_N$ is a correction factor. According to Geldart $K_N$ can be calculated from equation (III).

$$K_N = 5.31 - 4.88 \cdot \psi \qquad (III)$$

In equation (III) $\psi$ denotes the ratio of the surface area of the equivalent volume sphere to the surface area of the particle, or $(d_v/d_s)^2$, where $d_v$ is the (median) volume diameter and $d_s$ is the (median) surface diameter of the particle (see Section 2.2 of Geldart).

The $d_{90}$, $d_{10}$ and $d_{50}$ values in the equation are suitably and preferably volume diameters and the percentages 90%, 10% and 50% are based on the mass of the particles. However, as the ratio is dimensionless it is not absolutely mandatory for $d_{90}$, $d_{10}$ and $d_{50}$ to represent the volume diameter, but they may also represent another, such as surface per volume or surface, diameter as long as they all represent the same diameter.

It has now been found that the number $N_{Br}$ is a useful characteristic to describe the fluidization regime in the fluidized bed. At low values of $N_{Br}$ the bed is in transport conditions. When $N_{Br}$ increases the bed goes over to fluidized conditions, first to entrained fluidization, then bubbling fluidization and finally minimum fluidization. For low values of $N_{Br}$ of less than 2.5 the bed is in transport conditions. Thereby a substantial entrainment of polymer from the bed takes place depending on particles' size and size distribution. Operation in this regime increases the risk of producing fines due to particle attrition. Powder mixing will be reduced as there is mainly conveying. Cyclone separation efficiency is also reduced and the risk of blocking solids transport line increases. On the other hand, for high values of $N_{Br}$ of greater than 7 the bed is in standard bubbling conditions and then mass and heat transfer within the bed remain insufficient. The solids mixing may be ineffective, increasing the risk of fouling and agglomeration of particles. The operation of the reactor may become less stable, leading to an increased risk of reactor shut-down.

An advantage of the present invention is that when producing polymer with a narrow particle size distribution in accordance with the present method and arrangement, a reduced particle segregation and more homogenous mixing in the fluidized bed is achieved, even though no mixing device or distribution plate are used, and thus better operability and performance of the reactor are achieved. With the present invention the reactor has less risk for experiencing solids segregation phenomena, it is more homogeneous in terms of particle size distribution (i.e., the particle size distribution is the same at different reactor locations), there is not so much risk for particle overheating due to absence of large-size particles, the quality of the fluidization is high (very sufficient gas-solid mixing) since there are not disturbances during the fluidization caused by large size particles.

A further advantage of the present invention is that due to solids circulation via at least three cyclones and the ability to remove the agglomerates from the bottom zone of the reactor the small size particles stay longer in the fluidized bed and the large particles and agglomerates spend shorter time in the fluidized bed compared to conventional fluidized bed reactor systems. Thus, particle size distribution with narrow span is achieved; typically at least 20% decrease in the span of the particle size distribution can be detected compared to particle size distribution of polymers produced in conventional gas phase reactors.

A further advantage of the present invention is that having the capability to fluidize polymer particles with narrow particle size distribution, smooth reactor operation with enhanced mass and heat transfer is experienced. This enables decrease in operability issues relating to the formation of particle agglomerates as well as to lower concentration of fines in the reactor compared to conventional gas phase reactor operation. This will substantially contribute in enhancing the quality of fluidization (i.e. sufficient interaction between solids and gaseous components) and increasing the fluidized bed homogeneity towards narrow particle size distribution, thus contributing to production of polymer with enhanced chain microstructure homogeneity, in other words polymers having the same molecular properties (MWD, Mw, polydispersity index, comonomer incorporation etc.).

A further advantage of the present invention is that due to narrow particle size distribution the particulate material can be easily processed to the subsequent surge and purge bin units where the unreacted reactants and solvents are removed. Since the large size particles have been removed by the production line, it will be easier to remove efficiently all the remaining hydrocarbons (i.e., ethylene, propylene, propane, 1-butene, 1-hexene, etc.) so that the polymer material will meet the needed product quality requirements. In the opposite case where large size particles and agglomerates are present during the downstream processing, the high molecular weight hydrocarbons (i.e., propane, 1-butene and 1-hexene) cannot be sufficiently removed and a significant amount stays in the polymer particles, thus not meeting product properties requirements, especially for film applications where organoleptic properties are important.

BRIEF DESCRIPTION OF THE FIGURES

In the following the invention is described in more detail by means of preferred embodiments with reference to the attached drawings, in which FIG. 1 is a flow diagram of an example embodiment of the invention.

DETAILED DESCRIPTION OF THE INVENTION

The present invention relates to a method of producing polymer particles, more typically the present invention relates to a method of producing polymer particles having a narrow particle size distribution (PSD), wherein the method comprises polymerizing in a fluidized bed polymerization reactor comprising a fluidized bed in the reactor and the reactor having a top zone having a generally conical shape, a middle zone in direct contact with and below said top zone having a generally cylindrical shape, a bottom zone in direct contact with and below the middle zone and having a generally conical shape thereby polymerizing at least one olefin, optionally at least one comonomer and optionally hydrogen, in the presence of a polymerization catalyst and fluidization gas to obtain (i) a first stream comprising fluidization gas and particles of olefin polymer, (ii) a second stream comprising fluidization gas and agglomerates of olefin polymer, (iii) a third olefin polymer product stream, directing the first stream comprising fluidization gas and olefin polymer particles to a series of at least three cyclones connected to the fluidized bed reactor thereby obtaining from the last cyclone in the series a final stream of fluidization gas depleted of olefin polymer particles and from the cyclones in the series a final stream of olefin polymer particles separated from the fluidization gas, separating agglomerates of olefin polymer from the second stream comprising fluidization gas and agglomerates of olefin polymer and removing the separated agglomerates from bottom zone of the reactor, withdrawing from the fluidized bed polymerization reactor the third olefin polymer product stream.

The third olefin polymer product stream has typically a narrow particle size distribution.

The present invention relates further to an apparatus of producing polymer particles, more typically of producing polymer particles having a narrow particle size distribution (PSD) wherein the apparatus comprises a fluidized bed polymerization reactor comprising a fluidized bed in the reactor and the reactor having a top zone having a generally conical shape, a middle zone in direct contact with and below said top zone having a generally cylindrical shape, a bottom zone in direct contact with and below the middle zone and having a generally conical shape, typically in the absence of gas distribution grid, for polymerizing at least one olefin, optionally at least one comonomer and optionally hydrogen, in the presence of a polymerization catalyst and fluidization gas to obtain a first stream comprising fluidization gas and fine particles of olefin polymer, a second stream comprising fluidization gas and agglomerates of olefin polymer, a third olefin polymer product stream, a series of at least three cyclones connected to the fluidized bed reactor thereby obtaining from the last cyclone in the series a final stream of fluidization gas depleted of olefin polymer particles and from the cyclones in the series a final stream of olefin polymer particles separated from the fluidization gas, means for separating agglomerates of olefin polymer from the second stream comprising fluidization gas and agglomerates of olefin polymer and means for removing the separated agglomerates from bottom zone of the reactor, means for withdrawing the third olefin polymer product stream.

The present invention relates also the use of the above arrangements for producing olefin polymer, more typically for producing olefin polymer having narrow particle size distribution.

The description and parameters as well as the equipment described below and relating to the method of the present invention relate also to the arrangement (apparatus) and use of the arrangement disclosed above.

The method further comprises directing the first stream comprising fluidization gas and olefin polymer particles to a series of at least three cyclones connected to the fluidized bed reactor. The series of at least three cyclones typically comprises a first cyclone, a second cyclone and a third cyclone. Typically in the present invention from the last (typically third) cyclone in the series a final stream of fluidization gas depleted of olefin polymer particles is obtained and from the cyclones in the series a final stream of olefin polymer particles separated from the fluidization gas is obtained. The final stream of olefin polymer particles may be obtained from any one or two or three or more or all of the cyclones connected in series in any combination and combined to form a final stream of separated olefin polymer particles. For example, in a series of three cyclones, connected to the fluidized bed polymerization reactor in series, the first stream comprising fluidization gas and olefin polymer particles is directed to a first cyclone thereby removing a first part of olefin polymer particles from the first stream to obtain a fourth stream comprising fluidization gas and a reduced amount of olefin polymer particles and a fifth stream of separated olefin polymer particles. The fourth stream comprising fluidization gas and a reduced amount of olefin polymer particles is further directed to a second cyclone thereby removing a second part of olefin polymer particles as a sixth stream from the fourth stream to obtain a seventh stream comprising fluidization gas and further depleted of olefin polymer particles. The seventh stream comprising fluidization gas and still some olefin polymer particles is directed to a third cyclone, wherein a third part of olefin polymer particles is removed, thus an eighth stream of fluidization gas depleted of olefin polymer particles is removed from the third cyclone as a final stream of fluidization gas depleted of olefin polymer particles. The third part of olefin polymer particles separated in the third cyclone is a ninth stream, i.e. typically a final stream of separated olefin polymer particles. It should be noted that any one, two or three or more or all of the olefin polymer streams (16), (22) and (23) obtained from the cyclones connected in series may form the final stream of olefin polymer particles to be either recovered or recycled. These can also be recovered or recycled individually or in any combination.

The method further comprises separating agglomerates of olefin polymer from the second stream comprising fluidization gas and agglomerates of olefin polymer and removing the separated agglomerates from bottom zone of the reactor; the method further comprises withdrawing the third olefin polymer product stream. Typically the olefin polymer product stream has a narrow particle size distribution.

According to an embodiment of the present invention the method and arrangement is used for producing a polymer having a narrow particle size distribution.

In the method and arrangement of the present invention the span of the particle size distribution (PSD) of the obtained olefin polymer product in the third stream, i.e. the product stream is typically equal to or below 1.5, more typically from 1.0 to 1.5, even more typically from 1.1 to 1.4. This means that the polymer has a narrow particle size distribution, or in other words narrow span of particle size distribution. Typically, simultaneously the span of the catalyst particle size distribution is between 0.1 and 1.0.

Particle size distribution may be characterized, by indicating, both, the median particle size ($d_{50}$) and the span of the particle size distribution. The span is usually defined as $(d_{90}-d_{10})/d_{50}$, where $d_{90}$ is the particle size for which 90% by the weight of the particles have a diameter which is smaller than $d_{90}$; $d_{10}$ is the particle size for which 10% by the weight of the particles have a diameter which is smaller than $d_{10}$; and $d_{50}$ is the median particle size for which 50% by the weight of the particles have a diameter which is smaller than $d_{50}$.

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

As it is well understood in the art the superficial gas velocity denotes the velocity of the gas in an empty construction. Thus, the superficial gas velocity within the middle zone is the volumetric flow rate of the gas (in m³/s) divided by the cross-sectional area of the middle zone (in m²) and the area occupied by the particles is thus neglected.

The olefins polymerised in the process of the present invention are typically alpha-olefins having from 2 to 10 carbon atoms. Preferably the olefins are ethylene or propylene, optionally together with one or more other alpha-olefins having from 2 to 8 carbon atoms. Especially preferably the process of the present invention is used for polymerising ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

By fluidisation gas is meant the gas comprising monomer, and optionally comonomer(s), chain transfer agent and inert components which form the upwards flowing gas in the fluidised bed reactor and in which the polymer particles are suspended in the fluidised bed. The unreacted gas is collected at the top of the reactor, typically compressed, cooled and returned to the bottom of the reactor. As it is understood by the person skilled in the art the composition of the fluidisation gas is not constant during the cycle. Reactive components are consumed in the reactor and new reactive components are added into the circulation line for compensating losses.

Unless specifically otherwise defined, the percentage numbers used in the text refer to percentage by weight.

The method of the present invention is typically a continuous method.

Catalyst

The polymerisation is conducted in the presence of an olefin polymerisation catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has median particle size from 6 to 90 μm, preferably from 6 to 70 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR2 bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560, 671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerisation Stages

The polymerisation in the fluidised bed may be preceded by prior polymerisation stages, such as prepolymerisation or another polymerisation stage conducted in slurry or gas phase. Such polymerisation stages, if present, can be conducted according to the procedures well known in the art. Suitable processes including polymerisation and other process stages which could precede the polymerisation process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerisation stages.

Fluidized Bed Polymerization

In the fluidized bed polymerization reactor the polymerisation takes place in a gas phase, in a fluidised bed formed by the growing polymer particles in an upwards moving gas stream. In the fluidised bed the polymer particles, containing the active catalyst, come into contact with the reaction gases, such as monomer, optionally comonomer(s) and optionally hydrogen which cause polymer to be produced onto the particles.

The polymerisation takes place in a reactor including a bottom zone, a middle zone and a top zone. The bottom zone forms the lower part of the reactor in which the base of the fluidised bed is formed. The base of the bed forms in the bottom zone, typically in the absence of gas distribution grid, fluidisation grid, or gas distribution plate. Above the bottom zone and in direct contact with it is the middle zone. The middle zone and the upper part of the bottom zone contain the fluidised bed. When there is no fluidisation grid there is a free exchange of gas and particles between the different regions within the bottom zone and between the bottom zone and the middle zone. Finally, above the middle zone and in direct contact therewith is the top zone.

As it is well understood by the person skilled in the art the entrainment rate of the polymer depends on the bed height and the fluidisation velocity. Typically, the powder entrainment flux is from 0.1 to 70 kg/(s·m$^2$), such as from 0.3 to 40 kg/(s·m$^2$), wherein the entrainment flux is given as the flow rate of the powder entrained from the reactor with the fluidisation gas (in kg/s) divided by the cross-sectional area of the pipe through which the fluidisation gas is withdrawn from the top of the fluidised bed reactor. The process of the present invention is especially useful when the entrainment flux is at the upper end of the range, such as from 0.5 to 30 kg/(s·m$^2$).

The bottom zone of the reactor suitably has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidised bed starts to form. When the gas velocity becomes still smaller the bed becomes denser and the polymer particles distribute the gas over the whole cross-section of the bed.

Preferably, the equivalent cross-sectional diameter of the bottom zone is monotonically increasing with respect to the flow direction of the fluidisation gas through the fluidised bed reactor. As the flow direction of the fluidisation gas is upwards with respect to the base, the equivalent cross-sectional diameter of the bottom zone is vertically monotonically increasing.

The bottom zone preferentially has straight circular cone shape. More preferably, the cone-angle of the cone-shaped bottom zone is 5° to 30°, even more preferably 7° to 25° and most preferably 9° to 18°, whereby the cone-angle is the angle between the axis of the cone and the lateral surface. It is not necessary in this preferred embodiment, however, that the bottom zone has the shape of a perfect cone but it may also have a shape of a truncated cone.

The bottom zone may also be seen as being constructed of a plurality of conical sections having different cone-angles. In such a case it is preferred that at least the conical section where the base of the fluidised bed is formed has the cone-angle within the above-specified limits. In a most preferred embodiment all the conical sections forming the bottom zone have the cone-angles within the above-specified limits. If the bottom zone comprises multiple conical sections it is then preferred that the steeper sections with a narrower cone angle are located at the lower end of the bottom zone and the sections with a wider cone angle are located at the higher end of the bottom zone. Such arrangement is believed to increase the shear forces at the wall of the reactor thus helping to prevent the polymer from adhering to the walls.

It is further preferred that the equivalent diameter of the bottom zone increases from about 0.1 to about 1 metres per one metre of height of the bottom zone (m/m). More preferably, the diameter increases from 0.15 to 0.8 m/m and in particular from 0.2 to 0.6 m/m.

The preferred cone-angles lead to additional improved fluidisation behaviour and avoid the formation of stagnant zones. As a result, the polymer quality and stability of the process are improved. Especially, a too wide cone-angle leads to an uneven fluidisation and poor distribution of the gas within the bed. While an extremely narrow angle has no detrimental effect on the fluidisation behaviour it anyway leads to a higher bottom zone than necessary and is thus not economically feasible.

It is possible that there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

Typically the fluidised bed reactor of the present invention comprises no gas distribution grid or plate. The even distribution of the fluidisation gas within the bed is achieved by the shape of the bottom zone. The omission of the gas distribution grid reduces the number of locations where fouling and chunk formation can start. The terms gas distribution grid or gas distribution plate or fluidisation grid are used synonymously to denote a metal plate or a construction within the reactor which has a purpose of distributing the fluidisation gas evenly throughout the cross-sectional area of the reactor. In the reactors where a gas distribution grid is used it generally forms the base of the fluidised bed.

The middle zone of the fluidised bed reactor has a generally cylindrical shape. Preferably it will be in the form of a straight circular cylinder being denoted herein simply cylinder. From a more functional perspective, the middle zone will essentially form a domain wherein the superficial velocity of the fluidisation gas is essentially constant.

The middle zone typically contains most of the fluidised bed. While the bed extends also to the bottom and top zones, its major part is within the middle zone.

The middle zone has a ratio of the height over diameter (L/D) of at least about 4, preferably at least about 5. The height over diameter is typically not more than 15, preferably not more than 10.

The gas velocity within the middle zone is such that an effective circulation of solids is achieved. This leads to good heat and mass transfer within the bed, which reduce the risk of chunk formation and fouling. Especially, good powder flow near the walls of the reactor has been found to reduce the adhesion of polymer at the wall of the reactor. Suitably the superficial velocity of the fluidisation gas is within the range of from 0.35 to 1.0 m/s. The process of the present invention is especially useful when the superficial velocity of the fluidisation gas is within the range of from 0.40 to 0.9 m/s, preferably from 0.45 to 0.90 m/s, especially preferably from 0.50 to 0.90 m/s and in particular from 0.55 to 0.90 m/s.

The height L of the middle zone is the distance of the lowest point of the generally cylindrical part of the reactor to the highest point of the generally cylindrical part of the reactor. The lowest point of the generally cylindrical part is the lowest point above which the diameter of the reactor no longer increases with the height of the reactor but remains constant. The highest point of the generally cylindrical part is the lowest point above which the diameter of the reactor no longer remains constant with the height of the reactor but decreases. The diameter D of the middle zone is the (equivalent) diameter of the reactor within the generally cylindrical part.

The top zone of the reactor is shaped such that a gas-particle stream vicinal to the inner walls is created, whereby the gas-particle stream is directed downwards to the base. This gas-particle stream leads to an excellent particle-gas distribution and to an excellent heat transfer. Further the high velocity of the gas and particles vicinal to the inner walls minimizes lump- and sheet formation. The top zone suitably has a generally conical, upwards tapering shape. It is further preferred that the ratio of the height of the top zone to the diameter of the middle zone is within the range of from 0.3 to 1.5, more preferably 0.5 to 1.2 and most preferably 0.7 to 1.1.

It is particularly preferred that the cone forming the top zone is a straight circular cone and the cylinder forming the middle zone preferably is a circular cylinder. More preferably the cone-angle of the cone-shaped top zone is 10° to 50°, most preferably 15 to 45°. As defined above, the cone-angle is the angle between the axis of the cone and the lateral area.

The specific cone-angles of the cone-shaped upper zone further improve the tendency for back-flow of the particles counter current to the fluidisation gas. The resulting unique pressure balance leads to an intensive break up of bubbles, whereby the space-time-yield and solids concentration are further increased. Further as mentioned above, the wall flow velocity, i.e., the velocity of particles and gas vicinal to the inner walls is high enough to avoid the formation of lumps and sheets.

In a preferred embodiment the reactor used for the method of the present invention has a top zone which has a generally conical, upwards tapering shape, a middle zone in direct contact with and below said top zone which has a generally cylindrical shape, and a bottom zone indirect contact with and below the middle zone, which has a generally conical shape tapering downwards.

Separation of Fine Particles

The upwards moving gas stream is established by withdrawing a fluidisation gas stream from the top zone of the reactor, typically at the highest location. The gas stream withdrawn from the reactor is then directed to the series of at least three cyclones connected to the reactor in series. Cyclonic separation is a method of removing particulates from gas without the use of filters, through vortex separation. When removing particulate matter from gas, gas cyclones are used. The gas cyclone geometry, together with the flow rate define a cut point of the cyclone which is the mean particle size of the fine particles that will be removed from the stream with at least 50% efficiency so that particles larger than the cut point will be removed with a greater efficiency and smaller particles with a lower efficiency.

Fines removal/separation in method and apparatus of the present invention takes place in at least three-stage cyclonic separation series using conventional (known in the art) gas cyclones (devices for separating solids from gas). The three cyclones are identical in terms of operation and geometrical features (length to diameter ratio, etc.) but different in size. Typically the first two cyclones are the same in size. Typically the ratio of the internal pipe diameter of the first cyclone to the internal pipe diameter of the second cyclone is in the range of 2 to 5, more typically from 3 to 4. Typically the ratio of the diameter of the cylindrical part of the first cyclone to the diameter of the cylindrical part of the second cyclone is in the range of 3 to 6, more typically from 4 to 5. Typically the ratio of the overall height of the first cyclone to the overall height of the second cyclone is in the range of 2 to 5, more typically from 3 to 4.

In general, the larger-size particles are collecting in the bottom stream of the two first cyclones (dense phase) and the small size particles (fines) are present in the lean phase of the second cyclone which are directed to a third cyclone in order to simply collect them. Subsequently, the fines either they will be returned back to the reactor or they will be completely removed from the process (depending on the product quality and reactor operability).

Fines means in this connection small-size polymer particles (i.e., for polyethylene size<150 microns, for polypropylene size<220 microns) which have the tendency to carry over and typically cause operability challenges in gas phase reactors (i.e., bed segregation, poor fluidization quality, electrostatic charges) and also product quality issues (i.e., product inhomogeneity, white spots,). Larger-size particles means for polyethylene size equal to or >150 microns, for polypropylene size equal to or >220 microns.

The flow rate of the gas-solid stream diminishes from first cyclone to the second cyclone and from the second cyclone to the third cyclone. Typically the flow rate to the first cyclone is between 1 to 120 t/h. The flow rate to the second cyclone is typically between (0.01-0.07)×(1-120 t/h), in other words 0.01×flow rate to the first cyclone—0.07×flow rate to the first cyclone. The flow rate to the third cyclone is typically between (0.01-0.05)×flow rate to the second cyclone.

More precisely, the first stream comprising fluidization gas and olefin polymer particles is directed to a first cyclone thereby removing a first part of olefin polymer particles from the first stream to obtain a fourth stream comprising fluidization gas and a reduced amount of olefin polymer particles and a fifth stream of separated olefin polymer particles. The fourth stream comprising fluidization gas and a reduced amount of olefin polymer particles is further directed to a second cyclone thereby removing a second part of olefin polymer particles as a sixth stream from the fourth stream to obtain a seventh stream comprising fluidization gas and depleted of olefin polymer particles.

Typically the third (or the last if more than three cyclones are connected in series) cyclone is used for removing fines (very small size particles) from the stream of fluidization gas obtained from the preceding cyclones and still containing polymer particles.

Typically the method comprises the steps of (a) measuring the mass fraction of the polymer in the stream obtained from a last (typically third) cyclone connected in series, (b) determining an average mass fraction of polymer in the stream obtained from the last (typically third) cyclone connected in series based on the measured mass fraction over a period of time, and (c) directing the stream obtained from the last (typically third) cyclone connected in series into the fluidized bed reactor if the measured mass fraction of polymer is at least 20% less than the average mass fraction of polymer. This has an advantage that it is beneficial to identify if the collected fines (separated fines by the cyclones) are active (still polymerized) or passive. In the latter case the fines consist of inactive small pieces of catalyst particles which should be removed from the process because their presence causes operability issues (stickiness, electrostatic forces, reactor fouling) and quality related issues (white spots, etc.). So, during the dynamic operation of the reactor, the amount of the fines collected by the cyclones is continuously measured and monitored by using of any solids flow or solids weight device. When the steady state operation in the bed is reached (i.e., 3-5 residence time) the weight of the fines is used as a reference value. If during the dynamic operation of the process the measured weight of the fines increases by 20%, then, the fines are removed from the process and they are not returned into the reactor.

According to an embodiment of the invention in the first stream comprising fluidization gas and fine particles of olefin polymer, the $d_{50}$ of the fine particles of olefin polymer is less than 100 μm, typically less than 80 μm, more typically less than 50 μm. This may vary depending on the polymer grade produced. The measure $d_{50}$ means median particle size.

The present invention typically comprises three cyclones connected in series with the fluidized bed polymerization reactor. However, also higher number of cyclones may be used, such as, 4, 5 or 6 cyclones connected in series.

A cyclone in its simplest form is a container in which a rotating flow is established. Cyclone design is well described in the literature. Particularly suitable cyclones are described in documents Kirk-Othmer, Encyclopaedia of Chemical Technology, $2^{nd}$ edition (1966), Volume 10, pages 340-342.

The polymer content in the fluidization gas stream withdrawn from the top of the fluidized bed reactor (12) and directed to a series of at least three cyclones (gas/solids separation means) is in the range between 0.25% and 30%. From the cyclones (gas/solids separation means) an overhead stream and a solid recycling stream is taken. The overhead stream contains less solids by weight than the solid recycling stream.

Preferably, the overhead stream contains less than 5.0% by weight, more preferably less than 3.0% and even more preferably less than 1.0% by weight, even more preferably less than 0.75% and most preferably less than 0.5% by weight of solids. Preferably, the gas amount in the overhead stream is more than 95.0%, more preferably more than 97.0%, even more preferably more than 99.0% even more preferably more than 99.25% and most preferably more than 99.5% by weight.

The solid recycling stream, i.e. streams removed from the bottom of cyclone(s), typically contains mainly solid material and includes some gas between the particles. Accordingly the solid recycling stream contains the majority of the mass of the polymer particles that were entrained from the fluidized bed reactor with the fluidization gas stream (12) Typically the solid recycling stream (16 or 22 or 23) contains at least 75%, preferably 80% and more preferably 85% by weight solids and only at most 25%, preferably 20% and most preferably 15% by weight gas.

According to an embodiment of the invention the method and arrangement comprise at least three cyclones in series, i.e. a first cyclone, a second cyclone and a third cyclone. Typically, the first cyclone has separation efficiency from 93 to 99 weight-% of all particles of olefin polymer contained in the first stream after the polymerization and typically the separation efficiency of the second cyclone is from 98.5 to 99.0 weight-% of all particles of olefin polymer contained in the first stream after the polymerization. The separation efficiency of the third cyclone is from 99.0 to 99.9 weight-%. If more than three cyclones are used, the separation efficiency is typically above 99.8 weight-%. The separation efficiency is defined as the ratio between the flow rate of the solids leaving from the bottom of the cyclone to the flow rate of the solids entering the cyclone.

According to an embodiment of the invention the fifth stream of separated olefin polymer particles obtained from the first cyclone is recycled back to the fluidized bed polymerization reactor and/or recovered and mixed with the obtained olefin polymer product stream. According to a further embodiment of the invention, also the olefin polymer particles obtained from the second cyclone may be recycled back to the fluidized bed polymerization reactor and/or recovered and mixed with the obtained olefin polymer product stream. In other words, from the second cyclone obtained sixth stream of olefin polymer particles may be recycled back to the fluidized bed polymerizing reactor and/or recovered and mixed with the obtained olefin polymer product stream. From the third cyclone is obtained eighth and ninth streams. The eighth stream is fluidization gas depleted of polymer particles, typically directed back to the reactor. The ninth stream is a stream of separated polymer particles.

Typically the eighth stream is compressed and re-introduced to the bottom zone of the reactor. Preferably, the gas is filtered before being passed to the compressor. Additional monomer, optionally comonomer(s), optionally hydrogen and inert gas are suitably introduced into the circulation gas line. It is preferred to analyse the composition of the circulation gas, for instance, by using on-line gas chromatography and adjust the addition of the gas components so that their contents are maintained at desired levels.

Thus, the fifth stream and/or the sixth stream and/or the ninth stream may be returned into the fluidised bed reactor or it may be withdrawn as the polymer product. According to an embodiment of the present invention at least a part of the polymer recovered from a cyclone is returned to the fluidised bed reactor.

Agglomerates Removal

Typically in the second stream comprising fluidization gas and agglomerates of olefin polymer, the $d_{50}$ of particles, i.e. agglomerates and/or catalyst particles is typically above 25 mm.

According to an embodiment of the invention the agglomerates of olefin polymer that can be formed during the dynamic operation are separated from the fluidization gas and withdrawn from the bottom zone of the reactor, typically by using an agglomerate trap.

Withdrawal of Agglomerates

The agglomerates optionally present in the reactor may be withdrawn by using an agglomerate trap below the bottom zone and suitably below the base of the fluidized bed. After recovering the agglomerates may be disposed of or they may be crushed and mixed with the product.

When the agglomerates reach a certain size they no longer remain fluidised by the fluidisation gas but start falling downwards in the bed. When they are big enough they fall through the bottom zone to the agglomerate trap. The critical size depends on the fluidisation velocity, on one hand, and the density of the fluidised bed, on the other hand. Especially the density of the bed has a strong effect on the residence time of the agglomerates in the bed before they drop out of the bed. In the normal operation conditions as described above, for instance a bed density between 180 and 320 kg/m3 and the fluidization velocity in the middle zone between 0.55 and 0.95 m/s, the residence time of the agglomerates in the bed is typically not more than 300 seconds and preferably not more than 180 seconds. Usually the agglomerate does not drop instantaneously through the bed but remains there at about 5 seconds, minimum.

The agglomerate trap typically comprises a cylinder which is isolated from the bottom zone and the downstream equipment, for instance, by two valves. The valves are operated in sequence to allow filling and emptying of the cylinder.

The content of agglomerates in the trap, or a process variable which indicates the content of the agglomerates, is measured. Such measurement may include the measurement of the density of the contents of the agglomerate trap, for instance by radioactive measurement.

Another option is to measure the temperature in the agglomerate trap. The polymer and polymer agglomerates still contain active catalyst and therefore they are heated by the heat of the polymerisation. The inventors have found that the temperature in the agglomerate trap may increase substantially when the trap contains agglomerates, for instance by at least 2.5° C., or by at least 3° C., such as from 4° C. to 30° C. or even more, or from 5° C. to 20° C., or even more. The advantage of the temperature measurement is that the measurement is not hazardous, it is cheap and easy to implement and the accuracy is good.

Instead of measuring the temperature in the agglomerate trap it is also possible to measure a temperature difference, for instance, between the temperature in the agglomerate trap and the bottom zone of the reactor, or the difference in the temperatures in the agglomerate trap during two different process steps.

The opening and closing of the isolation devices, such as valves, is suitably controlled by a sequence controller. According to one suitable mode of operation the connection to the bottom zone of the reactor is kept open. At a suitable point of time the connection is closed and discharging of the agglomerate trap to the downstream process is activated. When the discharge is completed then the connection to the bottom zone of the reactor is reopened.

According to one preferred embodiment the opening and closing of the valves may be controlled so that when the measurement indicates the presence of agglomerates in the agglomerate trap then the connection to the bottom zone is closed and the discharge is activated. When the discharge is completed the connection to the bottom zone is reopened.

According to another preferred embodiment the sequence controller, such as a programmable logic controller, keeps the connection to the bottom zone open for a predetermined period. After the lapse of the period the connection to the bottom zone is closed and the discharge activated. When the discharge is completed the connection to the bottom zone is reopened.

It is important that during the operation of the process the connection between the agglomerate trap and the bottom zone of the reactor, on one hand, and the discharge of the agglomerate trap, on the other hand, are not open simultaneously. If they were, they would allow the discharge of a large amount of gas from the reactor, resulting in unstable process.

It is possible to introduce pressurised gas via a separate line to the agglomerate trap for flushing the trap. The pressurised gas can be inert gas, such as nitrogen, or it may be the circulation gas from the circulation gas line which returns the fluidisation gas from the top of the reactor to the bottom thereof.

As the person skilled in the art understands, the agglomerate trap, including the connection lines and the valves, must be designed to allow the flow of the agglomerates from the bottom zone to the trap. Also it must be possible to discharge the agglomerates from the agglomerate trap. Typically the agglomerates have a size of from 25 to 100 mm, or even greater. The design should thus allow the removal of at least 25 mm objects. Suitably the minimum diameter of the pipes and equipment in the agglomerate trap is at least 50 mm, preferably at least 100 mm and more preferably at least 150 mm.

Product Withdrawal

The third polymer product stream is withdrawn from the reactor. The third polymer product stream has a narrow particle size distribution. Typically it is preferred to withdraw polymer from the middle zone of the reactor.

The polymer is withdrawn from the middle zone in any manner known in the art, either intermittently or continuously. It is preferred to withdraw the polymer continuously because then the conditions in the reactor fluctuate less than with intermittent withdrawal. Both methods are well known in the art. Continuous withdrawal is disclosed, among others, in WO-A-00/29452, EP-A-2330135 and EP-A-2594433. Intermittent withdrawal is disclosed, among others, in U.S. Pat. No. 4,621,952, EP-A-188125, EP-A-250169 and EP-A-579426.

In a preferred continuous withdrawal method the polymer is withdrawn through an open pipe. In one preferred embodiment the pipe is equipped with a control valve which position is automatically adjusted to maintain a desired outflow rate. The valve position may be set, for instance, by the reactor bed level controller. In another preferred embodiment the pipe discharges the polymer to a vessel, the pressure of which is controlled to maintain a desired pressure difference between the reactor and the vessel. The pressure difference then sets the polymer flow rate from the reactor to the vessel.

According to an embodiment of the invention the olefin polymer product stream having a narrow particle size distribution is further subjected to downstream processes, such as removal of hydrocarbons in the post-reactor treatment stage, mixing with additives and extrusion.

Post-Reactor Treatment

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778. After the removal of residual hydrocarbons the polymer is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

The present invention relates also to use of the apparatus of the present invention for producing olefin polymer having a narrow particle size distribution, wherein the particle size distribution defined as $(d_{90}-d_{10})/d_{50}$, of the obtained olefin polymer product in the third stream is equal to or below 1.4, typically from 1.0 to 1.4.

DESCRIPTION OF DRAWINGS

Reference Numbers Used 2 fluidized bed polymerization reactor
4 top zone
5 eighth stream of fluidization gas depleted of olefin polymer particles (optionally back to reactor 2)
6 middle zone
8 bottom zone
10 catalyst feed and optionally polymer feed from previous steps
12 a first stream comprising fluidization gas and particles of olefin polymer
14 a fourth stream comprising fluidization gas and reduced amount of olefin polymer particles
15 seventh stream comprising fluidization gas reduced amount of olefin polymer particles
16 fifth stream of a first part of separated olefin polymer particles
18 a first cyclone
20 a second cyclone
22 sixth stream comprising a second part of separated olefin polymer particles
23 ninth stream comprising olefin polymer particles (final stream of olefin polymer particles)
26 a first line of recycling separated fine olefin polymer particles
28 a third cyclone
30 a third olefin polymer product stream
34 agglomerates removal outlet
36 a first three-way valve
37 a second three-way valve
38 a third line for recovering olefin polymer particles
39 a fourth line for recovering olefin polymer particles
40 a third three-way valve
41 a fifth line for recovering olefin polymer particles The FIGURE is an example embodiment of the method and arrangement of the present invention, for producing polymer particles with narrow particle size distribution (PSD), wherein the invention comprises a reactor system comprising a reactor (2), which has a bottom zone (8), a middle zone (6) and a top zone (4). The fluidisation gas is introduced into the bottom zone (8) through a line (5) obtained from a third (or last) cyclone (28). While the gas flows upwards through the bottom zone (8) its superficial velocity reduces due to the increasing diameter. A fluidised bed starts to form within the bottom zone (8). The gas continues to travel upwards through the middle zone (6) where the gas velocity is constant and the bed is fully formed. Finally the gas reaches the top zone (4) from where together with entrained solids, passes along line as a first stream (12) to a first cyclone (18). The first cyclone (18) removes a first part of the entrained solids from the circulation gas which is passed with the non-separated solids through the gas outlet line as a fourth stream (14) to a second cyclone (20). The second cyclone (20) removes almost all of the remaining entrained solids from the gas as seventh stream (15), which is passed to a third cyclone (28). In the third cyclone (28) a third part of the polymer particles are removed. From the third cyclone (28) the fluidization gas is recovered as eighth stream (5) and directed optionally to a compressor (not shown in the FIGURE) and then optionally to a cooler (not shown in the FIGURE) and from the cooler the gas may be introduced to the reactor (2).

Fifth, sixth and ninth streams of separated olefin polymer particles are passed from the first, second and third cyclones (18), (20) and (8) to lines (16), (22) and (23) as fifth, sixth and ninth streams via rotary feeders (not shown in the FIGURE) or any other powder feed arrangements to control the solids flow rate (not shown in the FIGURE). Downstream of the rotary feeders (not shown in the FIGURE) there are first, second and third three-way valves (36), (37) and (40) which direct the powder stream either via first, second and third lines (38), (39) and (41) to downstream process stages or return the powder streams into the reactor (2) along a first line (26). It should be noted that any one, two or three or all of the olefin polymer streams (16), (22) and (23) obtained from the cyclones connected in series may form the final stream of olefin polymer particles to be either recovered or recycled. These can also be recovered or recycled individually or in any combination.

The polymer product is withdrawn from the reactor (2) along one or more outlets (30) as a third stream. Catalyst, optionally dispersed within polymer particles from a preceding polymerisation stage, is introduced into the reactor (2) along line (10). Agglomerates are removed though outlet (34).

EXAMPLES

In the following examples H2 means hydrogen, C2 means ethylene, C3 means propane and C4 means 1-butene.

Example 1

Ziegler Natta catalyst particles exhibiting a size distribution with $d_{10}$ equal to 10 μm, $d_{50}$ equal to 25 μm, and $d_{90}$ equal to 40 μm, (i.e., span=1.0) were polymerized in a continuous PE pre-polymerization reactor at temperature equal to 70° C. and pressure equal to 65 barg using propane as solvent (2300 kg/h), 350 Kg/h ethylene feed rate, 0.1 KgH2/tnC3, 40 KgC4/tnC3 for a mean residence time of 30 min and with a mean measured catalyst activity equal to 2 Kg/gcat/h. Subsequently, the polymer material was transferred to a slurry loop reactor where it polymerized at temperature equal to 85° C. and pressure equal to 63 barg with hydrogen to ethylene ratio (expressed as mol per kmol) equal to 300 (H2/C2=300), 1-butene to ethylene ratio (expressed as mol per kmol) equal to 600 (C4/C2=600) with a solids concentration in the slurry-phase loop reactor equal to 37%-weight for a mean residence of 60 mins and with a mean measured catalyst activity equal to 18 Kg/gcat/h. After the loop reactor the residual hydrocarbons were flushed out and the polymer particles were transferred to a conventional bubbling fluidized gas phase reactor (GPR) equipped with a distribution plate and having internal diameter equal to 4.0 m and cylindrical section height equal to 15 m. The superficial gas velocity was equal to 0.5 m/s and the polymerization carried out at temperature equal to 80° C. and overall pressure equal to 19 barg. 5.5 bar ethylene partial pressure was used and 1-butene was also added (co-polymerization conditions). The hydrogen to ethylene ratio (expressed as mol per kmol) was equal to 8 (H2/C2=8) and the 1-butene to ethylene ratio (expressed as mol per kmol) equal to 100 (C4/C2=100). In the GPR the polymer particles were polymerized for a mean residence time equal to 2 hours and with a mean measured catalyst activity equal to 12 Kg/gcat/h. The $d_{10}$, $d_{50}$ and $d_{90}$ of the polymer particles produced in the gas phase reactor were measured (i.e., see Table 1). It can be observed that broad PSD is produced (i.e., span>2.2) which contributes in experiencing severe operability issues and fluidization instability challenges (solids segregation and poor performance).

In this polymerization run no significant agglomerates were detected.

TABLE 1

Catalyst and polymer PSD in a fluidized bed reactor having distribution plate (C4/C2 = 100 mol/kmol).

| PSD Characteristics | Catalyst (μm) | Polymer Particle in GPR (μm) |
|---|---|---|
| $d_{10}$ | 15 | 15 |
| $d_{50}$ | 25 | 800 |
| $d_{90}$ | 40 | 2050 |
| Span | 1.0 | 2.4 |

Example 2

The first example was repeated with the only difference being the operating conditions in the conventional bubbling fluidized gas phase reactor (GPR). Thus, the polymerization was carried out at temperature equal to 85° C. and overall pressure equal to 19 barg. 4.5 bar ethylene partial pressure was used and 1-butene was also added (co-polymerization conditions). The hydrogen to ethylene ratio (expressed as mol per kmol) was equal to 8 (H2/C2=8) and the 1-butene to ethylene ratio (expressed as mol per kmol) equal to 650 (C4/C2=650). In the GPR the polymer particles were polymerized for a mean residence time equal to 2 hours and with a mean measured catalyst activity equal to 18 Kg/gcat/h. The $d_{10}$, $d_{50}$ and $d_{90}$ of the polymer particles produced in the gas phase reactor were measured (i.e., see Table 2). It can be observed that broad PSD is produced (i.e., span>2.5) which contributes in experiencing severe operability issues and fluidization instability challenges (solids segregation and poor performance). It has to be mentioned that a large amount of agglomerates were produced (i.e., having size above 5 cm) which caused significant fluidization issues and the fluidized bed was unstable. The agglomerated particles were not considered in the particle size distribution analysis.

TABLE 2

Catalyst and polymer PSD in a fluidized bed reactor having distribution plate (C4/C2 = 650 mol/kmol).

| PSD Characteristics | Catalyst (μm) | Polymer Particle in GPR (μm) |
|---|---|---|
| $d_{10}$ | 15 | 180 |
| $d_{50}$ | 25 | 830 |
| $d_{90}$ | 40 | 2350 |
| Span | 1.0 | 2.6 |

Example 3

The second example was repeated with the only difference that after the flashing step the polymer particles were fed to a gas phase reactor having conical bottom and top zones in the absence of distribution plate and having an internal diameter equal to 3.6 m and cylindrical section height equal to 16 m. The superficial gas velocity was equal to 0.7 m/s and the reactor was connected in series with one cyclone having dimensions: inlet pipe diameter equal to 1.0 m, internal pipe diameter equal to 0.9 m, diameter of the cylindrical part equal to 1.8 m and overall height equal to 5.7 m. The solids flow rate at the inlet of the cyclone was 80 tn/h and the material flow rate removing from the bottom of the cyclone was 77.60 tn/h. The polymer particles are circulating between the reactor and the cyclone, and the small-size polymer particles are removed from the top of the cyclone upstream. It was also found that particles having size above 2.5 cm were collecting at the agglomeration trap during the dynamic operation and they were continuously removing from the bottom of the reactor. Thus, better particle homogeneity compared to conventional GPR was achieved. It can be seen that polymer particles having PSD of relatively narrow span can be produced (i.e., span<2.0) which can improve the bed homogeneity, reduce the risk of segregation and enhance the operability (see also Table 3). It has to be mentioned that the cyclone solids separation efficiency was equal to 97.0%-weight.

TABLE 3

Catalyst and polymer PSD in gas-phase-one cyclone reactor configuration (C4/C2 = 650 mol/kmol).

| PSD Characteristics | Catalyst (μm) | Polymer Particle in GPR (μm) |
|---|---|---|
| $d_{10}$ | 15 | 220 |
| $d_{50}$ | 25 | 850 |
| $d_{90}$ | 40 | 1820 |
| Span | 1.0 | 1.88 |

Example 4

The second example was repeated with the only difference that after the flashing step the polymer particles were fed to the same as in example 2 gas phase reactor which is equipped with two cyclones connected in series. Both cyclones have the same geometrical characteristics, i.e., inlet pipe diameter equal to 1.0 m, internal pipe diameter equal to 0.9 m, diameter of the cylindrical part equal to 1.8 m and overall height equal to 5.7 m.

The solids flow rate at the inlet of the first and second cyclones were 80 tn/h and 2.4 tn/h, respectively while the solids flow rate in the downstream of the first and second cyclones were 77.60 tn/h and 2.376 tn/h, respectively.

The polymer particles are circulating between the reactor and the two cyclones configuration and the small-size polymer particles are removed from the top of the second cyclone upstream. It was also found that particles having size above 2.5 cm were collecting at the agglomeration trap during the dynamic operation and they were continuously removing from the bottom of the reactor. Thus, better particle homogeneity compared to conventional gas phase reactor equipped with distribution plate was achieved. It can be seen that polymer particles having PSD of much narrower span compared to conventional gas phase reactor can be produced (i.e., span<1.60) which can substantially improve the bed homogeneity, reduce the risk of solids segregation and enhance the operability (see also Table 4). It has to highlighted that the cyclones separation efficiencies were equal to 97%-weight and 99.0%-weight, respectively.

TABLE 4

Catalyst and polymer PSD in DCR-two cyclones configuration (C4/C2 = 650 mol/kmol).

| PSD Characteristics | Catalyst (μm) | Polymer Particle in GPR (μm) |
|---|---|---|
| $d_{10}$ | 15 | 280 |
| $d_{50}$ | 25 | 960 |
| $d_{90}$ | 40 | 1630 |
| Span | 1.0 | 1.51 |

Example 5 (Inventive)

The second example was repeated with the only difference being that after the flashing step the polymer particles were fed to the same as in example 3 gas phase reactor which is equipped with three cyclones connected in series. The first two cyclones have the same geometrical characteristics, i.e., inlet pipe diameter equal to 1.0 m, internal pipe diameter equal to 0.9 m, diameter of the cylindrical part equal to 1.8 m and overall height equal to 5.7 m. The third cyclone has an inlet pipe diameter equal to 1.0 m, internal pipe diameter equal to 0.25 m, the diameter of the cylindrical part is equal to 0.45 m and the overall height is equal to 1.5 m.

The solids flow rate at the inlet of the first, the second and the third cyclones were 80 tn/h, 2.4 tn/h and 0.024 tn/h respectively, while the the solids flow rate in the downstream of the first, the second and the third cyclones were 77.60 tn/h, 2.376 tn/h and 0.0239 tn/h, respectively. The polymer particles are circulating between the reactor and the three cyclones configuration and the small-size polymer particles are removed from the top of the second cyclone upstream. It was also found that particles having size above 2.5 cm were collecting at the agglomeration trap during the dynamic operation and they were continuously removing from the bottom of the reactor. Thus, substantially enhanced particle homogeneity compared to conventional gas phase reactor equipped with distribution plate was achieved. It can be seen that polymer particles having PSD of much narrower span compared to gas phase reactor equipped with two cyclones can be produced (i.e., span<1.30) which can further improve the bed homogeneity, largely reduce the risk of solids segregation and fully enhance the operability (see also Table 5). It has to be highlighted that the cyclones separation efficiencies were equal to 97%-weight, 98.0%-weight and 99.5%-weight, respectively.

TABLE 5

Catalyst and polymer PSD in DCR-three cyclones configuration (C4/C2 = 650 mol/kmol).

| PSD Characteristics | Catalyst (μm) | Polymer Particle in GPR (μm) |
|---|---|---|
| $d_{10}$ | 15 | 350 |
| $d_{50}$ | 25 | 1000 |
| $d_{90}$ | 40 | 1600 |
| Span | 1.0 | 1.25 |

Example 6

The fifth example was repeated under the same operating conditions and reactants composition. In the gas phase reactor the polymer particles were polymerized for a mean residence time equal to 2 hours and with a mean measured catalyst activity equal to 18 Kg/gcat/h. The upstream of the second cyclone is connected to a third cyclone where the small-size particles (fines) are almost totally separated by the outgoing gas(es). The third cyclone was equipped with level measurement devices (i.e., radioactive measurements and ΔP measurements) capable of measuring the solids flow rate going downwards. It was experimentally measured (off-line) that the size of particles in the third vessel was below 120 μm. The solids flow rate of the polymer material collected in that vessel was 23.9 Kg/h and that flow rate was monitored and it remained constant after 10 hours of operation. During that time all the solids material coming out of the bottom of the third cyclone was returned back to the gas phase reactor. The morphological characteristics of the catalyst and the final powder are depicted in table 6.

TABLE 6

Results of Example 6

| PSD Characteristics | Catalyst (μm) | Polymer Particle in GPR (μm) |
|---|---|---|
| $d_{10}$ | 15 | 350 |
| $d_{50}$ | 25 | 1000 |
| $d_{90}$ | 40 | 1600 |
| Span | 1.0 | 1.25 |

Example 7 (Inventive)

The sixth example was repeated. The solids flow rate of the material removed from the third cyclone was 23.9 Kg/h after 10 hours of operation. Then, the polymerization conditions in the gasphase reactor changed with respect to hydrogen to ethylene ratio (expressed as mol per kmol) and a new value equal to 0.5 (H2/C2=0.5) was selected. The measured mean catalyst activity was equal to 18 Kg/gcat/h. After 30 minutes from the H2/C2 ratio change, the solids flow rate of the material removed from the bottom of the third cyclone reached a value equal to 27 Kg/h and after 2 hours of operation 28.5 Kg/h and after 3 hours of operation it reached 31 Kg/h. At that time a control valve action took place and the position of the subsequent three-way valve was changed so that the material was not returned back to gas phase reactor but to a vessel (dump tank) where fines were separated from the process. It was experimentally measured off-line that the size of such particles was below 120 μm. The morphological characteristics of the catalyst and the final powder are depicted in table 7.

TABLE 7

Results of Example 7.

| PSD Characteristics | Catalyst (μm) | Polymer Particle in GPR (μm) |
|---|---|---|
| $d_{10}$ | 15 | 400 |
| $d_{50}$ | 25 | 1000 |
| $d_{90}$ | 40 | 1600 |
| Span | 1.0 | 1.20 |

It will be obvious to person skilled in the art that, as the technology advances, the inventive concept can be implemented in various ways. The invention and its embodiments are not limited to the examples above but may vary within the scope of the claims.

The invention claimed is:

1. A method of producing polymer particles wherein the method comprises
polymerizing in a fluidized bed polymerization reactor comprising a fluidized bed in the reactor and the reactor having a top zone having a generally conical shape, a middle zone in direct contact with and below said top zone having a generally cylindrical shape, a bottom zone in direct contact with and below the middle zone and having a generally conical shape thereby polymerizing at least one olefin, optionally at least one comonomer and optionally hydrogen, in the presence of a polymerization catalyst and fluidization gas to obtain
(i) a first stream comprising fluidization gas and olefin polymer particles,
(ii) a second stream comprising fluidization gas and agglomerates of olefin polymer,
(iii) a third olefin polymer product stream,
directing the first stream comprising fluidization gas and olefin polymer particles to a series of at least three cyclones connected to the fluidized bed polymerization reactor thereby obtaining from a last cyclone in the series a final stream of fluidization gas depleted of olefin polymer particles and from the at least three cyclones in the series a final stream of olefin polymer particles separated from the fluidization gas,
separating agglomerates of olefin polymer from the second stream comprising fluidization gas and agglomerates of olefin polymer and removing the separated agglomerates from the bottom zone of the fluidized bed polymerization reactor, and
withdrawing from the fluidized bed polymerization reactor the third olefin polymer product stream.

2. The method according to claim 1 wherein the method is for producing polymer particles having a narrow particle size distribution (PSD) in the third olefin polymer product stream.

3. The method according to claim 2, wherein the narrow particle size distribution (PSD), defined with the span of the particle size distribution as $(d_{90}-d_{10})/d_{50}$, of the obtained olefin polymer product in the third olefin polymer product stream is equal to or below 1.5.

4. The method according to claim 1, wherein in the first stream comprising fluidization gas and olefin polymer particles, the olefin polymer particles have a $d_{50}$ value (median particle size) less than 150 μm.

5. The method according to claim 1, wherein in the second stream comprising fluidization gas and agglomerates of olefin polymer, the agglomerates have $d_{50}$ (median particle size) equal to or larger than 25 mm.

6. The method according to claim 1, wherein the series of at least three cyclones comprises a first cyclone, a second cyclone and a third cyclone and the first cyclone has a separation efficiency from 93 to 99 weight-% of all olefin polymer particles contained in the first stream after the polymerization and/or the second cyclone has a separation efficiency from 98.5 to 99.0 weight-% of all olefin polymer particles contained in the first stream after the polymerization, and/or the third cyclone has a separation efficiency from 99.0 to 99.9 weight-% of all olefin polymer particles contained in the first stream.

7. The method according to claim 1, further comprising the steps of (a) measuring the mass flow of the polymer in the stream obtained from a cyclone connected in series, (b) determining an average mass flow of polymer in the stream obtained from the last cyclone connected in series based on the measured mass flow over a period of time, and (c)

directing the stream obtained from the last cyclone connected in series into the fluidized bed polymerization reactor if the measured mass flow of polymer is at least 20% less than the average mass flow of polymer.

8. The method according to claim 1, wherein agglomerates of olefin polymer are separated from the fluidization gas and withdrawn from the bottom zone of the reactor by using an agglomerate trap.

9. The method according to claim 2, wherein the olefin polymer product stream having a narrow particle size distribution is further subjected to post reactor treatment in order to remove unreacted hydrocarbons.

10. The method according to claim 1 wherein the fluidized bed polymerization reactor has no gas distribution grid.

11. An apparatus of producing polymer particles having a narrow particle size distribution (PSD) wherein the apparatus comprises
a fluidized bed polymerization reactor comprising a fluidized bed in the reactor and the reactor having a top zone having a generally conical shape, a middle zone in direct contact with and below said top zone having a generally cylindrical shape, a bottom zone in direct contact with and below the middle zone and having a generally conical shape, for polymerizing at least one olefin, optionally at least one comonomer and optionally hydrogen, in the presence of a polymerization catalyst and fluidization gas to obtain
a first stream comprising fluidization gas and fine particles of olefin polymer,
a second stream comprising fluidization gas and agglomerates of olefin polymer,
a third olefin polymer product stream,
a series of at least three cyclones connected to the fluidized bed polymerization reactor thereby obtaining from a last cyclone in the series a final stream of fluidization gas depleted of fine particles of olefin polymer and a final stream of fine particles of olefin polymer separated from the fluidization gas,
means for separating agglomerates of olefin polymer from the second stream comprising fluidization gas and agglomerates of olefin polymer and means for removing the separated agglomerates from bottom zone of the reactor, and
means for withdrawing the third olefin polymer product stream.

12. A method comprising producing olefin polymer having a narrow particle size distribution with the apparatus of claim 11.

13. A method according to claim 12, wherein in the third stream of the obtained olefin polymer product the particle size distribution of the polymer defined as $(d_{90}-d_{10})/d_{50}$, is equal to or below 1.5.

14. The method according to claim 3, wherein the narrow particle size distribution (PSD) of the obtained olefin polymer product in the third olefin polymer product stream is from 1.0 to 1.5.

15. The method according to claim 3, wherein the narrow particle size distribution (PSD) of the obtained olefin polymer product in the third olefin polymer product stream is from 1.1 to 1.4.

16. The method according to claim 4, wherein in the first stream comprising fluidization gas and olefin polymer particles, the olefin polymer particles have a $d_{50}$ value (median particle size) less than 120 μm.

17. The method according to claim 4, wherein in the first stream comprising fluidization gas and olefin polymer particles, the olefin polymer particles have a $d_{50}$ value (median particle size) less than 80 μm.

18. The method according to claim 13, wherein in the third stream of the obtained olefin polymer product the particle size distribution of the polymer defined as $(d_{90}-d_{10})/d_{50}$, is from 1.0 to 1.5.

19. The method according to claim 13, wherein in the third stream of the obtained olefin polymer product the particle size distribution of the polymer defined as $(d_{90}-d_{10})/d_{50}$, is from 1.1 to 1.4.

* * * * *